US009824048B2

(12) United States Patent
Peng et al.

(10) Patent No.: US 9,824,048 B2
(45) Date of Patent: Nov. 21, 2017

(54) METHOD FOR EFFECTIVELY TRANSMITTING DATA

(71) Applicant: ACCUSYS STORAGE LTD., Hsinchu County (TW)

(72) Inventors: Ming-Tang Peng, Hsinchu County (TW); Yao-Tien Huang, Hsinchu County (TW); Wen-Yao Chuang, Miaoli County (TW); Chun-Ching Chang, Hsinchu County (TW)

(73) Assignee: Accusys Storage Ltd., Zhubei, Hsinchu County (TW)

(*) Notice: Subject to any disclaimer, the term of this patent is extended or adjusted under 35 U.S.C. 154(b) by 359 days.

(21) Appl. No.: 14/681,217

(22) Filed: Apr. 8, 2015

(65) Prior Publication Data
US 2016/0224498 A1    Aug. 4, 2016

(30) Foreign Application Priority Data
Jan. 30, 2015   (TW) .............................. 104103215 A

(51) Int. Cl.
| G06F 13/00 | (2006.01) |
| H05K 7/10 | (2006.01) |
| G06F 13/40 | (2006.01) |
| G06F 13/42 | (2006.01) |
| G06F 3/06 | (2006.01) |

(52) U.S. Cl.
CPC .......... G06F 13/4022 (2013.01); G06F 3/061 (2013.01); G06F 3/067 (2013.01); G06F 3/0635 (2013.01); G06F 3/0659 (2013.01); G06F 13/4282 (2013.01)

(58) Field of Classification Search
None
See application file for complete search history.

(56) References Cited

U.S. PATENT DOCUMENTS

| 5,875,349 | A | * | 2/1999 | Cornaby | ................. G06F 3/061 710/33 |
| 5,941,972 | A | * | 8/1999 | Hoese | ................... G06F 3/0605 710/105 |
| 6,098,129 | A | * | 8/2000 | Fukuzawa | ............. G06F 3/0623 709/200 |
| 6,138,176 | A | * | 10/2000 | McDonald | .............. G06F 3/061 710/241 |
| 7,398,421 | B1 | * | 7/2008 | Limaye | ................... H04L 69/40 714/16 |

(Continued)

Primary Examiner — Elias Mamo
(74) Attorney, Agent, or Firm — Rosenberg, Klein & Lee

(57) ABSTRACT

A method for effectively transmitting data, in which a switch is connected between a plurality host and storage, comprises steps of the following. First, the hosts recognize the storages via the switch, and revise a data transmission path within an original command, meanwhile transforming it into a specific command. Later, the switch receives the specific command, alternatively revises the data transmission path or not, and transforms the specific command into a standard command. The standard command is then transmitted to the storage. After receiving it, the storage is able to search for a corresponding host based on the data transmission path such that data is simply transmitted between the storage and its corresponding host. By employing the proposed method, the present invention is beneficial to reducing system complexity and raising data transmission efficiency.

17 Claims, 4 Drawing Sheets

(56) References Cited

U.S. PATENT DOCUMENTS

| | | | | |
|---|---|---|---|---|
| 8,976,799 B1* | 3/2015 | Baker | ................. | G06F 13/4027 |
| | | | | 370/401 |
| 2007/0266110 A1* | 11/2007 | Chawla | ............... | H04L 67/1097 |
| | | | | 709/217 |

* cited by examiner

METHOD FOR EFFECTIVELY TRANSMITTING DATA

This application claims priority for Taiwan patent application no. 104103215 filed on Jan. 30, 2015, the content of which is incorporated by reference in its entirely.

BACKGROUND OF THE INVENTION

Field of the Invention

The present invention is related to a data transmitting method, and more particularly to a method that employs a switch to transmit data between a host and a storage without data passing through a mother board of the switch such that data can be transmitted much more effectively than before.

Description of the Prior Art

Since Peripheral Component Interconnect Express (PCIe) is one of the commonly used PC system bus protocols, it can be applied to PC interconnections or to other external IC chips, for example, a graphic card with graphic processing units. Alternatively, PCIe protocols can also be utilized for connecting a PC to its I/O devices such that data, for example, multimedia info, can be transmitted there-in-between. In general, a data transmitting speed of PCIe protocol is about 500 MBps to 8 GBps depending on different types of bus widths or specifications. Recently, for speeding up the data transmitting efficiency and achieving full-duplex transmission, a brand new protocol known as Thunderbolt (TB) has been provided.

Specifically, TB is a novel protocol used for full-duplex transmission in high speed I/O technology. Its efficiency is beyond that of all I/O technologies nowadays and can increase the bi-directional transmitting speed by more than 10 GBps. Moreover, TB protocol merely utilized a single wire to transmitting both data for PCIe and Display Port at the same time, which in turns provides much more flexibility and simplicity in practical than ever. However, when TB protocols are applied nowadays, problems still arise. For example, when there are a plurality of storages which are commonly connected to a plurality of hosts, then the command sent from the host must be transformed through a certain process to become a certain format such that the command can be transmitted from the host to the storage. Under such circumstance, since the command sent from the host must be transformed through a certain process to become a certain format, only the storage which can read the certain format can be adopted in the structure. Therefore, when applying this method in practical, the types of storages which can be used are seriously limited, and lacks of universality too.

Another prior method was purposed, in which the command sent from the host is transmitted to an intermediate mother board first, and the data to be sent is accompanied by the command to be transmitted to the intermediate mother board, too. Later, the command is transformed into a universal command and is transmitted to the storage. Meanwhile, the data to be sent is also transmitted to the storage for the storage to access. The benefits of applying this method are that, the command eventually got to the storage is the universal format that most of the storages can access. Therefore, most of the storages nowadays which can read the universal format can be adopted in the system structure, solving the above mentioned problems occurred in the previous method. Nevertheless, what causes the more severe problems are when using this method, both the command and the data to be sent are transmitted through 1. the host to the intermediate mother board; and 2. the intermediate mother board to the storage. As a result, a much more high-level mother board is a must in the structure in order to handle such a great amount of computation. In addition, the space for the memory inside the mother board (i.e. DRAM) has to accordingly increase as well.

Moreover, if the numbers of hosts and storages connected thereto are increased, then the mother board and its memory space inside have to be much more advanced and sophisticated too. In other words, the cost consumption is a terrible issue to overcome.

On account of all, it should be obvious that there is indeed an urgent need for the professionals in the field for a new data transmitting method to be developed that can actively and aggressively induce the data to be transmitted between at least one host and storage so as to solve the above-mentioned problems occurring in the prior design.

SUMMARY OF THE INVENTION

In order to overcome the above-mentioned disadvantages, one major objective in accordance with the present invention is provided for a novel and creative method for effectively transmitting data which can successfully solves the problems of prior arts. By employing the method, a switch is provided to be connected between a plurality of host and storage and a highly-efficient data transmission speed is accomplished.

Another objective in accordance with the present invention is provided for a novel method for effectively transmitting data, wherein by employing the switch, data to be sent from the host can be directly transmitted to the storage without data passing through MB or other processing units of the switch. Therefore, it is beneficial to reducing system loads and raising data transmission efficiency.

And yet another objective in accordance with the present invention is provided for a novel method for effectively transmitting data, in which the original command issued by the host is eventually transformed into a standard format that most of the storages nowadays are able to access, thereby solving the conventional problems that only certain brand of the storages could be adopted before and accordingly increasing universality as well.

For achieving the above mentioned objectives, the present invention provides a method for effectively transmitting data, comprising steps: (1) At least one host recognizes at least one storage via a switch; (2) The at least one host revises a data transmission path within an original command, and meanwhile transforms the original command into a specific command; (3) The at least one host transmits the specific command to the switch; (4) The switch receives the specific command, transforms the specific command into a standard command, and transmits the standard command to the at least one storage; and (5) The at least one storage receives the standard command and search for at least one corresponding host based on the data transmission path such that data is able to be transmitted between the at least one storage and its corresponding host.

According to one embodiment of the present invention, the step of transforming the specific command into the standard command is performed by a mother board of the switch. In addition, after the switch receives the specific command, it can further revise the data transmission path once again such that the at least one storage is able to recognize and search for its corresponding host for data transmission.

Furthermore, the standard command disclosed in the present invention is a SCSI command, which comprises data information and can be recognized and accessed by the storage. As such, since the SCSI command is one of the commonly used commands nowadays, most of the storages can be adopted to implement the present invention as long as they have the ability to access SCSI formats. As a result, by employing the method of the present invention, the storages connected to the hosts are not limited to a certain brand anymore, which accordingly solves the conventional problems. Moreover, it is believed that the present invention is much more advantageous of having wider universality and better potential to be developed when compared to the prior arts.

In another aspect, the present invention further provides a method for effectively transmitting data, comprising steps: (1) At least one host recognizes at least one storage via a switch; (2) The at least one host trans forms an original command into a specific command, and transmits the specific command to the switch; (3) The switch receives the specific command, transforms the specific command into a standard command, and revises its data transmission path; (4) After revision, the switch transmits the standard command to the at least one storage; and (5) The at least one storage receives the standard command and search for at least one corresponding host based on the data transmission path such that data is able to be transmitted between the at least one storage and its corresponding host.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
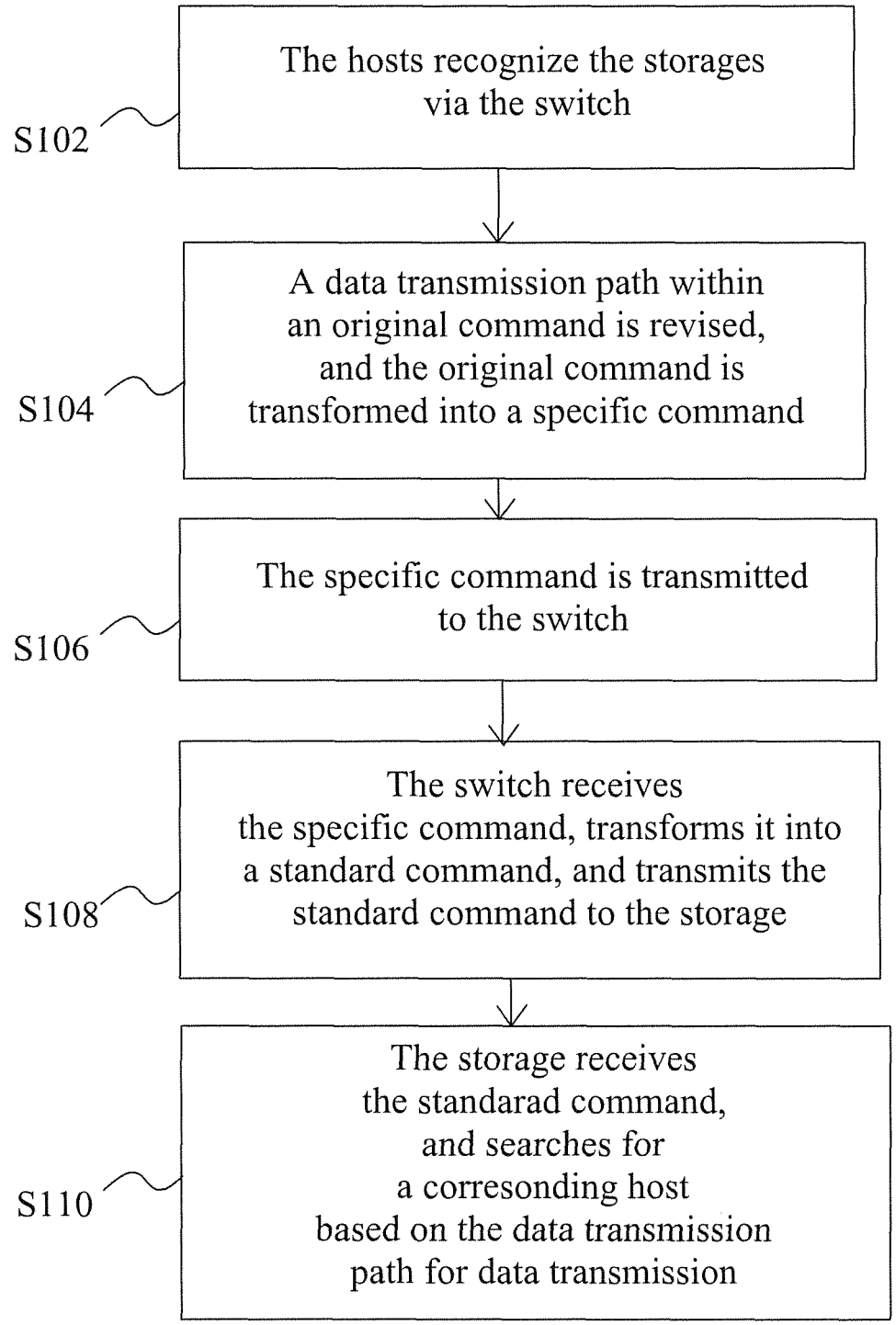
FIG. 1 shows a flow chart of the method for effectively transmitting data in accordance with one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

Figure 2:
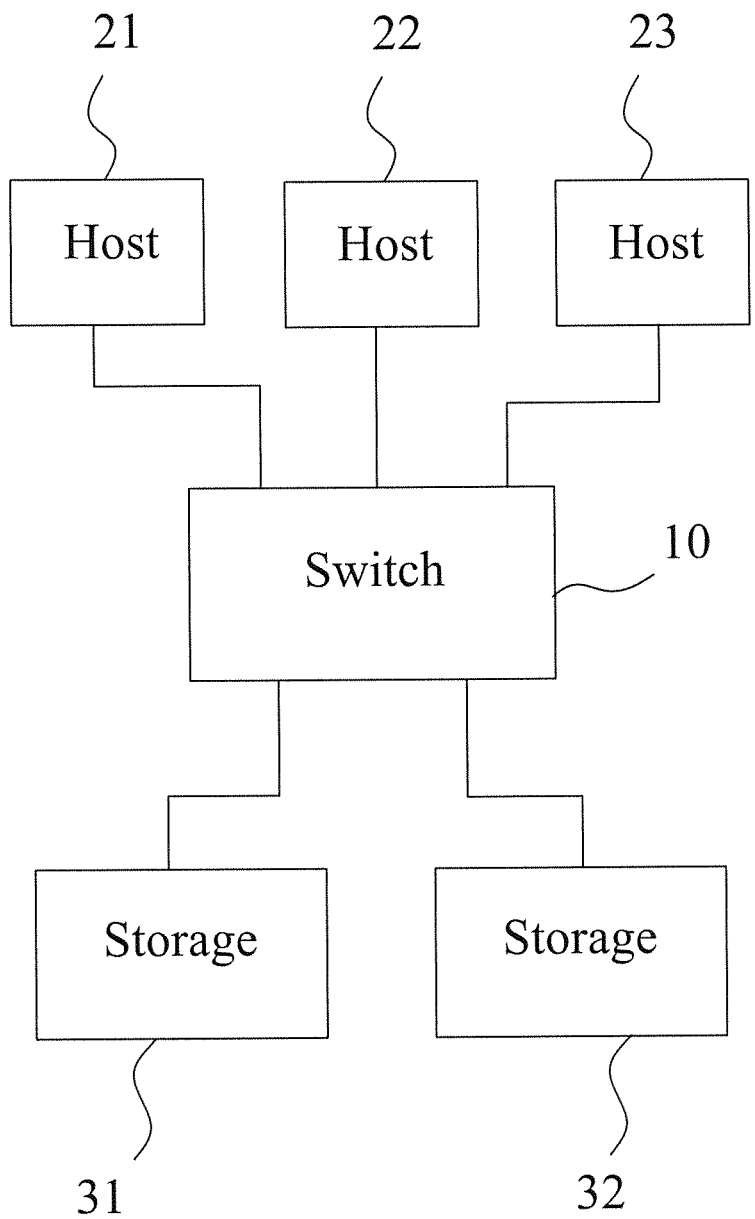
FIG. 2 shows a schematic diagram of a system structure the method is applied to in accordance with one embodiment of the present invention.

Please refer to FIG. 1, which shows a flow chart of the method for effectively transmitting data in accordance with one embodiment of the present invention. As shown in FIG. 1, the method of the present invention comprises steps S102, S104, S106, S108 and S110. To show an exemplary embodiment of the present invention, please refer to FIG. 2 at the same time, which shows a schematic diagram of a system structure the method is applied to in accordance with one embodiment of the present invention, wherein a switch 10 is connected between a plurality of host 21, 22, 23 and at least one storage device. According to the present invention, the number of the storage device can be one or more than one. FIG. 2 merely shows that the system comprises two storages 31, 32 as one embodiment. However, the present invention is not limited thereto. By employing the method provided by the present invention, it is believed that the data to be sent can be transmitted between the hosts 21, 22, or 23 and the storages 31 or 32 without passing through a mother board or other processing unit of the switch 10. A complete and detailed description will be discussed below.

According to a first embodiment of the present invention, as shown in step S102, the switch 10 is connected between the hosts 21, 22, 23 and the storages 31, 32 such that the hosts 21, 22, 23 can recognize the storages 31, 32 via the switch 10. Later, as shown in step S104, a data transmission path within an original command is revised by the hosts 21, 22, or 23, and meanwhile the original command is transformed into a specific command. For example, the original command can be issued by at least one of the hosts 21, 22, 23, and be transformed into a specific format by at least one driver of the hosts 21, 22, 23. According to the embodiment of the present invention, the driver of the hosts 21, 22, 23 performs to add some specific column information based on the original command such that the original command is turned into a specific format of command.

Later as shown in step S106, the specific command is then transmitted from the hosts 21, 22, or 23 to the switch 10. And in step S108, after the switch 10 receives the specific command, it transforms the specific command into a standard format of command, i.e. a standard command, and transmits the standard command to the storages 31 or 32. At last, as shown in step S110, upon receiving the standard command and based on its data transmission path, the storage 31 or 32 can search for an adequate host 21, 22 or 23 such that data transmission can directly take place between the storage 31 or 32 and its corresponding host 21, 22 or 23 without data passing through a mother board or other processing units of the switch 10.

Specifically, the standard command disclosed in the present invention is a SCSI command, which comprises data information and can be recognized and accessed by the storages 31, 32. As such, regardless the original command the host 21, 22, or 23 issues is a read or write command, the original command can eventually be transformed into the standard SCSI command by the help of switch 10. Since the SCSI command is one of the commonly used commands nowadays, most of the storages can be adopted to implement the present invention as long as they have the ability to access SCSI formats. In other words, by employing the proposed data transmitting method, the storages connected to the hosts are not limited to a certain brand anymore, which accordingly solves the conventional problems. Moreover, it is believed that the present invention is much more advantageous of having wider universality and better potential to be developed when compared to the prior arts.

Figure 3:
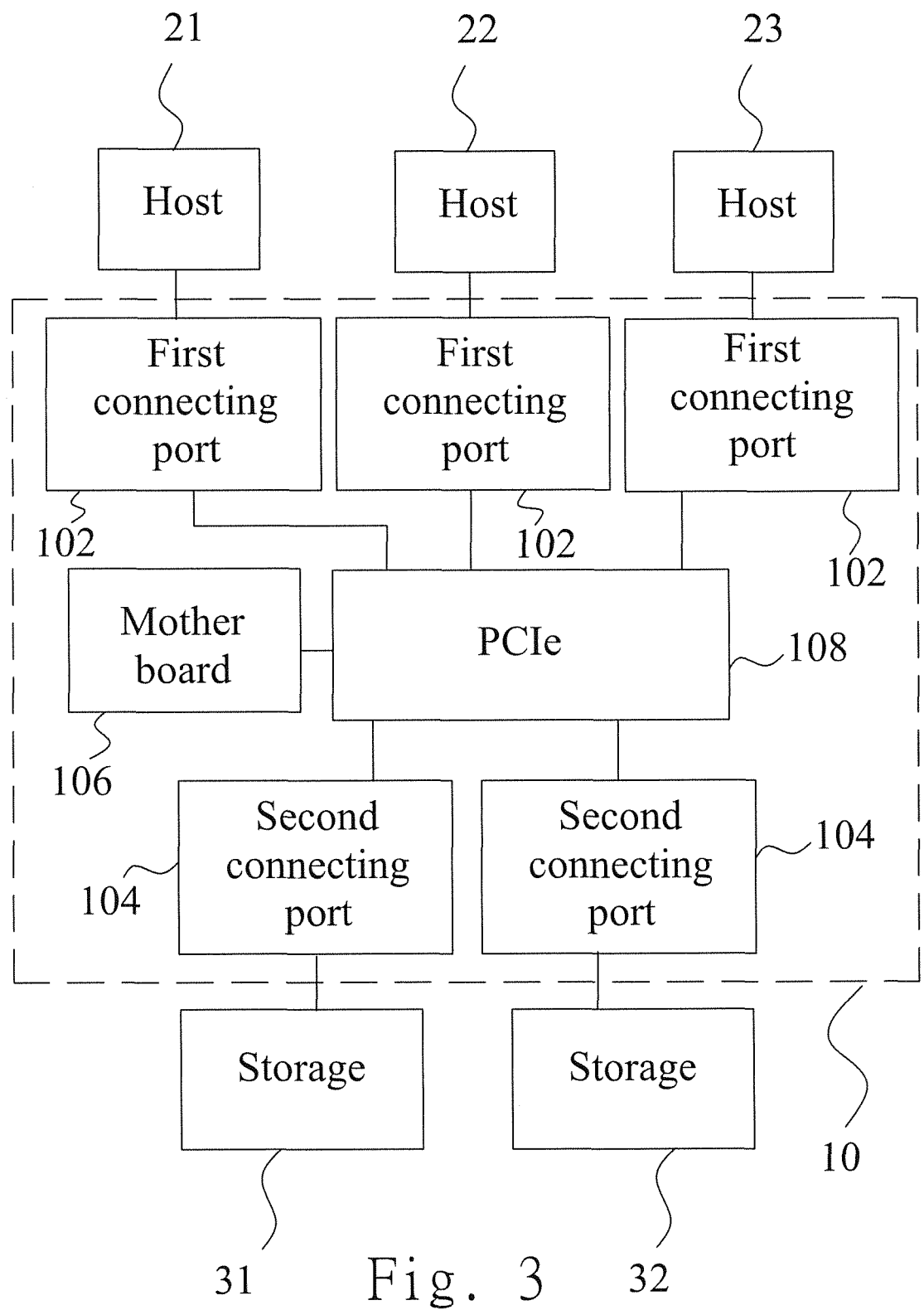
FIG. 3 shows a schematic diagram of a system structure comprising a detailed drawing of the switch in accordance with one embodiment of the present invention.

Please refer to FIG. 3, which shows a schematic diagram of a system structure comprising a detailed drawing of the switch in accordance with one embodiment of the present invention. As shown in FIG. 3, the switch 10 comprises a plurality of first connecting port 102, at least one second connecting port 104, a mother board (MB) 106 and a PCIe 108. Each of the first connecting ports 102 is accordingly connected to a host 21, 22, or 23; each of the second connecting ports 104 is accordingly connected to a storage 31 or 32. That is to say, the numbers of first connecting ports 102 and second connecting ports 104 should be based on the numbers of hosts and storages disposed in the system, respectively. As such, as shown in FIG. 3, when the system comprises three hosts 21, 22, 23 and two storages 31, 32, then the system should comprise three first connecting ports 102 and two second connecting ports 104 accordingly.

In detailed, the PCIe 108 is connected between the first connecting ports 102 and the second connecting ports 104, and the mother board 106 is connected to the PCIe 108. According to the embodiment of the present invention, the mother board 106 is used for performing the above mentioned step S108. In other words, the transformation of the specific command into the standard command described in the step of S108 is performed by the mother board 106 of the switch 10. Based on these, the present invention further provides a second embodiment of the present invention, in which the mother board 106 can revise the data transmission path within the command once again. That is to say, after the step of S106 is done, when the switch 10 receives the specific command, it can perform command transformation in step of S108 and revise its data transmission path at the same time. By doing so, upon receiving the standard command, the storage 31 or 32 can search for an adequate host 21, 22 or 23 such that data transmission can directly take place between the storage 31 or 32 and its corresponding host 21, 22 or 23 without data passing through a mother board or other processing units of the switch 10.

Figure 4:
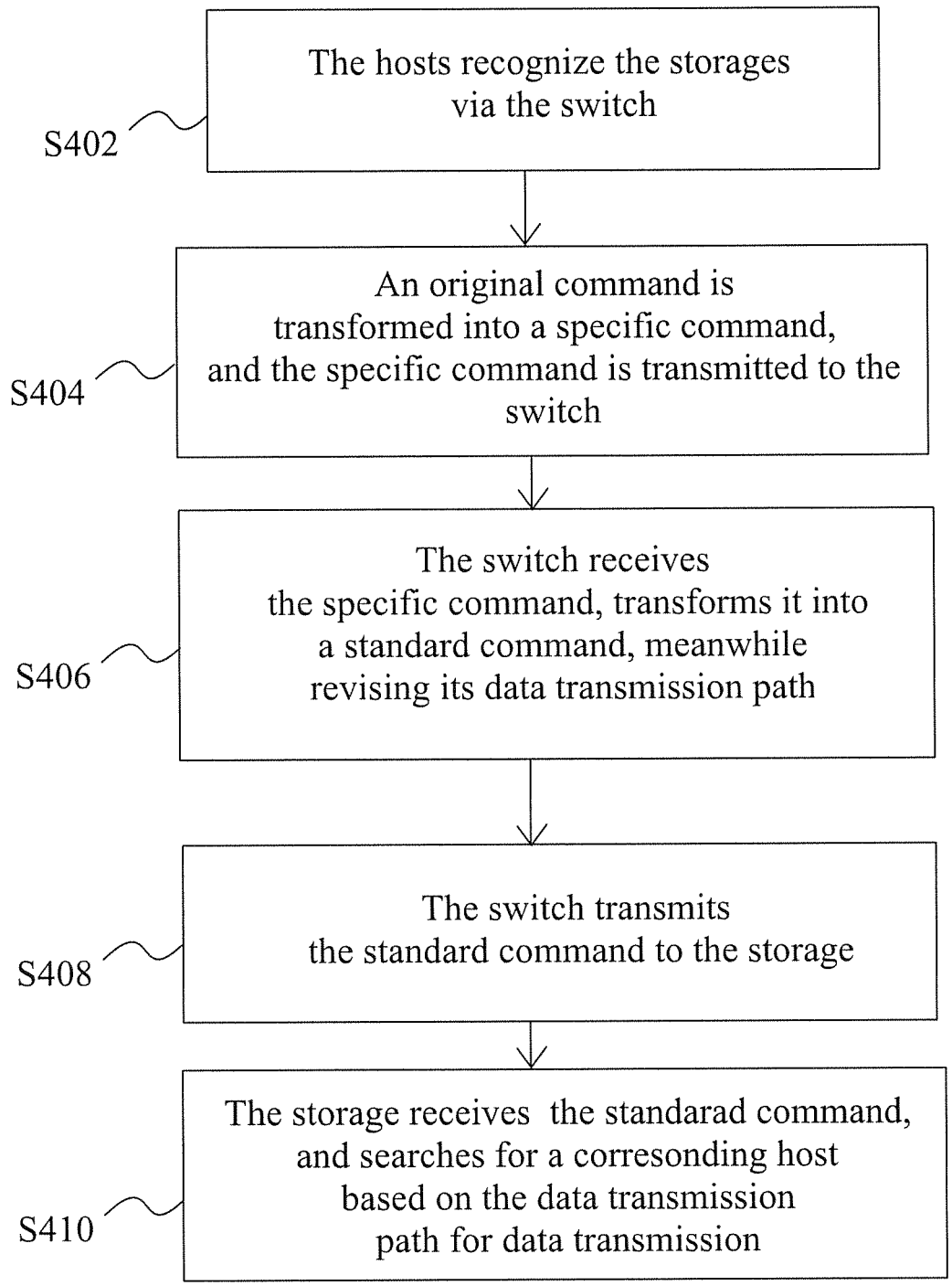
FIG. 4 shows a flow chart of the method for effectively transmitting data in accordance with another embodiment of the present invention.

Next, please refer to FIG. 4, which shows a flow chart of the method for effectively transmitting data in accordance with a third embodiment of the present invention. As shown in FIG. 4, the method of the present invention comprises steps S402, S404, S406, S408 and S410. What differs from the above mentioned first and second embodiments is that the revision of data transmission path disclosed in the third embodiment is not performed by a host, but by the switch itself. To well explain the third embodiment of the present invention, please refer to FIG. 2 at the same time, which shows a schematic diagram of a system structure the method is applied to in accordance with the embodiment of the present invention. By employing the method provided by the present invention, it is believed that the data to be sent can be transmitted between the hosts 21, 22, or 23 and the storages 31 or 32 without data passing through a mother board or other processing unit of the switch 10, thereby effectively decreasing a heavy load of the system and its data computation amount.

As shown in step of S402, the switch 10 is connected between the hosts 21, 22, 23 and the storages 31, 32 such that the hosts 21, 22, 23 can recognize the storages 31, 32 via the switch 10. Later, as shown in step S404, an original command is transformed into a specific command by the hosts 21, 22, or 23 and then sent to the switch 10. As previously said, the original command can be issued by at least one of the hosts 21, 22, 23, and be transformed into a specific format by at least one driver of the hosts 21, 22, 23. According to the embodiment of the present invention, the driver of the hosts 21, 22, 23 performs to add some specific column information based on the original command such that the original command is turned into a specific format of command.

Later as shown in step S406, the switch 10 receives the specific command, transforms it into a standard format of command, i.e. a standard command, meanwhile revising its data transmission path within the command. Finally as shown in steps S408 and S410, the switch 10 transmits the standard command to the storages 31 or 32. When the storages 31 or 32 receives the standard command, either of them can search for a corresponding host 21, 22, or 23 based on the data transmission path such that data transmission can directly occur between the storage 31 or 32 and its corresponding host 21, 22 or 23 without data passing through a mother board or other processing units of the switch 10.

Similarly, according to the third embodiment of the present invention, the standard format disclosed is known as a SCSI command which comprises data information and can be recognized and accessed by the storages 31, 32. As such, regardless the original command the host 21, 22, or 23 issues is a read or write command, the original command eventually can be transformed into the standard SCSI command by the help of switch 10. Since the SCSI command is one of the commonly used commands nowadays, most of the storages can be adopted to implement the present invention as long as they have the ability to access SCSI formats. As a result, by employing the proposed data transmitting method, it is believed that the storages connected to the hosts are not limited to a certain brand anymore, which accordingly solves the conventional problems. Moreover, it is obvious that the present invention is characterized by wider universality and better potential to be developed when compared to the prior arts. Furthermore, since the data to be sent does not need to pass through the mother board or other processing units of the switch anymore, it helps to reduce a great amount of system computation and complexity, making the proposed data transmitting method much more effective than ever.

Next, in order to further provide a better understanding of the technology used in the present invention, please refer to the system structure shown in FIG. 3, in which a plurality of thunderbolt (TB) chip are adopted for implementing the first and second connecting ports 102, 104 and a thunderbolt switch (TB switch) is adopted for implementing the switch 10 for descriptions of the three embodiments of the present invention discussed below.

Embodiment I, the data transmission path is revised by the host:
  i. The hosts 21, 22, 23 recognize each of the storages 31, 32 via the PCIe 108 (for example, a PEX8624) of the switch 10;
  ii. An original command issued by the hosts 21, 22, or 23 (for example, an access command) is transformed into a specific command, i.e. CMD_A by its driver. Meanwhile, the data transmission path is revised.
  iii. The specific command is transmitted from the hosts 21, 22, or 23 to the switch 10.
  iv. The motherboard 106 of the switch 10 transforms the specific command into a standard SCSI command, and transmits the SCSI command to the storages 31 or 32.
  v. Since the data transmission path comprises info that data is to be sent from the hosts 21, 22 or 23, when the storages 31 or 32 receives the SCSI command, either of them can search for a corresponding host based on the data transmission path for data transmission the re in between.

Embodiment II, the data transmission path is revised by the host and the switch:
  i. The hosts 21, 22, 23 recognize each of the storages 31, 32 via the PCIe 108 (for example, a PEX8624) of the switch 10;
  ii. An original command issued by the hosts 21, 22, or 23 (for example, an access command) is transformed into a specific command, i.e. CMD_A by its driver. Meanwhile, the data transmission path is revised.
  iii. The specific command is transmitted from the hosts 21, 22, or 23 to the switch 10.
  iv. The motherboard 106 of the switch 10 transforms the specific command into a standard SCSI command, meanwhile revises its data transmission path again, and then transmits the SCSI command to the storages 31 or 32.
  v. Since the data transmission path comprises info that data is to be sent from the hosts 21, 22 or 23, when the storages 31 or 32 receives the SCSI command, either of them can search for a corresponding host based on the data transmission path for data transmission the re in between.

Embodiment III, the data transmission path is revised by the switch:
  i. The hosts 21, 22, 23 recognize each of the storages 31, 32 via the PCIe 108 (for example, a PEX8624) of the switch 10;
  ii. An original command issued by the hosts 21, 22, or 23 (for example, an access command) is transformed into a specific command, i.e. CMD_A by its driver. And, the specific command is then transmitted to the switch 10.
  iii. The switch 10 receives the specific command, and its motherboard 106 transforms the specific command into a standard SCSI command, meanwhile revising its data transmission path.
  iv. After revision, the switch 10 transmits the SCSI command to the storages 31 or 32.
  v. Since the data transmission path comprises info that data is to be sent from the hosts 21, 22 or 23, when the storages 31 or 32 receives the SCSI command, either of them can search for a corresponding host based on the data transmission path for data transmission the re in between.

Therefore, to sum up, it is apparent that by using the method for effectively transmitting data of the present invention, the mother board or other processing units of the switch does not perform to process data but only commands. Since a ratio of sizes of command to data is generally about 1/1000, when the numbers of hosts and storages comprised in the system are increased, the mother board of the switch does not need to upgrade accordingly. In other words, the system cost is under control. Therefore, it is obvious that the present invention successfully solves the conventional problems that a huge consumption of system resources and transmission width always occurred in the prior arts. As a result, the system load is effectively reduced and data transmission efficiency is raised by employing the proposed method of the present invention.

Besides, the method for effectively transmitting data of the present invention further comprises advantageous including:
  i. The data transmitting speed is very fast since data is simply transmitted between the hosts and the storages.
  ii. Since MB is only used for handling commands and no extra sinew is needed in the switch, even if the system comprises a large number of hosts and storages, MB and its memory are still applicable without any upgrade needed.
  iii. Since the commands eventually received by the storages are transformed into standard SCSI commands, any brand of storage device that can access SCSI formats can be adopted in the present invention, thereby increasing the universality and marketing values of the present invention.

As a result, when compared to the prior arts, it is believed that the present invention is advantageous of both low system complexity and fabrication cost. Also, the data transmitting efficiency is highly improved, whereby having extraordinary availability and competitiveness for future industrial developments.

It will be apparent to those skilled in the art that various modifications and variations can be made to the present invention without departing from the scope or spirit of the invention. In view of the fore going, it is intended that the present invention cover modifications and variations of this invention provided they fall within the scope of the invention and its equivalent.

What is claimed is:

1. A method for effectively transmitting data, in which a switch is connected between a plurality of host and at least one storage such that data is able to be transmitted between said plurality of host and said at least one storage, said method comprising:
   using said plurality of host to recognize said at least one storage via said switch, said switch further comprises a plurality of first connecting port, at least one second connecting port, a mother board, and a PCIe, each of said first connecting ports is accordingly connected to each of said plurality of host, and said at least one second connecting port is accordingly connected to said at least one storage, said PCIe is connected between said plurality of first connecting port and said at least one second connecting port, and said mother board is connected to said PCIe;
   using at least one of said plurality of host to revise a data transmission path within an original command, and meanwhile to transform said original command into a specific command;
   transmitting said specific command to said switch;
   using said switch to receive said specific command, using said mother board to transform said specific command into a standard command, and using said switch to transmit said standard command to said at least one storage; and
   using said at least one storage to receive said standard command and search for at least one corresponding host of said plurality of host based on said data transmission path, and without passing through said mother board, said data is able to be transmitted between said at least one storage and said at least one corresponding host through said first connecting port, said second connecting port, and said PCIe.

2. The method for effectively transmitting data of claim 1, wherein said original command is issued by at least one of said plurality of host.

3. The method for effectively transmitting data of claim 2, wherein said original command is transformed into said specific command by at least one driver of said plurality of host.

4. The method for effectively transmitting data of claim 3, wherein said at least one driver performs to add some specific column information based on said original command such that said original command is turned into said specific command.

5. The method for effectively transmitting data of claim 1, wherein said original command is a read or write command.

6. The method for effectively transmitting data of claim 1, wherein said standard command comprises SCSI formats.

7. The method for effectively transmitting data of claim 1, wherein said standard command further comprises data information and formats of said standard command can be recognized and accessed by said at least one storage.

8. The method for effectively transmitting data of claim 1, wherein after said switch receives said specific command, said switch further revises said data transmission path once again.

9. The method for effectively transmitting data of claim 8, wherein said mother board revises said data transmission path.

10. A method for effectively transmitting data, in which a switch is connected between a plurality of host and at least one storage such that data is able to be transmitted between said plurality of host and said at least one storage, said method comprising:

using said plurality of host to recognize said at least one storage via said switch, said switch further comprises a plurality of first connecting port, at least one second connecting port, a mother board, and a PCIe, each of said first connecting ports is accordingly connected to each of said plurality of host, and said at least one second connecting port is accordingly connected to said at least one storage, said PCIe is connected between said plurality of first connecting port and said at least one second connecting port, and said mother board is connected to said PCIe;

using at least one of said plurality of host to transform an original command into a specific command and transmit said specific command to said switch;

using said switch to receive said specific command, revise a data transmission path within said specific command, and meanwhile using said mother board to transform said specific command into a standard command;

transmitting said standard command to said at least one storage; and using said at least one storage to receive said standard command and search for at least one corresponding host of said plurality of host based on said data transmission path, and without passing through said mother board, said data is able to be transmitted between said at least one storage and said at least one corresponding host through said first connecting port, said second connecting port, and said PCIe.

11. The method for effectively transmitting data of claim 10, wherein said original command is issued by at least one of said plurality of host.

12. The method for effectively transmitting data of claim 11, wherein said original command is transformed into said specific command by at least one driver of said plurality of host.

13. The method for effectively transmitting data of claim 12, wherein said at least one driver performs to add some specific column information based on said original command such that said original command is turned into said specific command.

14. The method for effectively transmitting data of claim 10, wherein said original command is a read or write command.

15. The method for effectively transmitting data of claim 10, wherein said standard command comprises SCSI formats.

16. The method for effectively transmitting data of claim 10, wherein said standard command further comprises data information and formats of said standard command can be recognized and accessed by said at least one storage.

17. The method for effectively transmitting data of claim 16, wherein said mother board revises said data transmission path.

* * * * *